Patented July 1, 1952

2,602,060

UNITED STATES PATENT OFFICE 2,602,060

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application March 5, 1951, Serial No. 214,001

9 Claims. (Cl. 252—337)

This invention relates to processes or procedures particularly adapted for preventing, breaking, or resolving emulsions of the water-in-oil type and particularly petroleum emulsions.

Complementary to the above aspect of the invention herein disclosed is my companion invention concerned with the new chemical products or compounds used as the demulsifying agents in said aforementioned processes or procedures, as well as the application of such chemical products, compounds, or the like, in various other arts and industries, along with the method for manufacturing said new chemical products or compounds which are of outstanding value in demulsification. See my co-pending application, Serial No. 214,002, filed March 5, 1951.

My present invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

The present invention is concerned with a process for breaking petroleum emulsions by means of fractional esters obtained from a polycarboxy acid and oxypropylated 4,4' dihydroxydiphenyl sulfone. Such 4,4' dihydroxydiphenyl sulfone is treated with propylene oxide so that the molecular weight based on the hydroxyl number is in the range of approximately 1,000 to approximately 5,000. Such oxypropylated derivatives are invariably xylene-soluble and water-insoluble. When the molecular weight, based on the hydroxyl value, is modestly in excess of 1,000, for instance, 1,200 to 1,500, and higher, the oxypropylated product is kerosene-soluble. My preference is to use an oxypropylated 4,4' dihydroxydiphenyl sulfone which is kerosene-soluble as an intermediate for combination with polycarboxy acids as hereinafter described. Such esterification procedure yields fractional esters which serve for the herein described purpose.

As hereinafter pointed out, however, one need not necessarily use the 4,4' sulfone but for the reason that the 2,4' isomer is the obvious functional equivalent and is just as satisfactory this applies, also, to a mixture of the two which is more economical to use as described subsequently.

As is well known, 4,4' dihydroxydiphenyl sulfone is a chemical compound having the following formula:

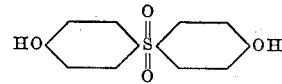

If for convenience the sulfone is indicated thus:

HO—R'—OH the product obtained by oxypropylation may be indicated thus:

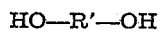

with the proviso that $n$ and $n'$ represent whole numbers, which, added together, equal a sum varying from 15 to 80, and the acidic ester obtained by reaction of the polycarboxy acid may be indicated thus:

in which the characters have their previous significance, and $n''$ is a whole number not over 2 and R is the radical of the polycarboxy radical:

and preferably free from any radicals having more than 8 uninterrupted carbon atoms in a single group, and with the further proviso that the parent diol prior to esterification be preferably kerosene-soluble.

Attention is directed to the co-pending application of C. M. Blair, Jr., Serial No. 70,811, filed January 13, 1949, now Patent 2,562,878, granted August 7, 1951, in which there is described, among other things, a process for breaking petroleum emulsions of the water-in-oil type, characterized by subjecting the emulsion to the action of an esterification product of a dicarboxylic acid and a polyalkylene glycol in which the ratio of equivalents of polybasic acid to equivalents of polyalkylene glycol is in the range of 0.5 to 2.0, in which the alkylene group has from 2 to 3 carbon atoms, and in which the molecular weight of the product is between 1,500 to 4,000.

Similarly, there have been used esters of dicarboxy acids and polypropylene glycols in which 2 moles of the dicarboxy ester have been reacted with one mole of a polypropylene glycol having a molecular weight, for example, of 2,000 so as to form an acidic fractional ester. Subsequent examination of what is said herein in comparison with the previous example as well as the hereto appended claims will show the line of delineation between such somewhat comparable compounds. Of greater significance, however, is what is said subsequently in regard to the structure of the parent diol as compared to polypropylene glycols whose molecular weights may vary from 1,000 to 2,000.

In the instant application the initial material is 4,4′ dihydroxydiphenyl sulfone which, although readily soluble in boiling water, is almost insoluble in cold water. It is merely a matter of definition, or rather temperature of water, to characterize the compound as water-insoluble or soluble. For convenience, so there will be no misunderstanding, it will be referred to as water-insoluble.

Numerous water-insoluble compounds susceptible to oxalkylation, and particularly to oxyethylation, have been oxyethylated so as to produce effective surface-active agents which, in some instances, at least have also had at least modest demulsifying property. Reference is made to similar monomeric compounds having a hydrophobe group containing, for example, 8 to 32 carbon atoms and a reactive hydrogen atom, such as the usual acids, alcohols, alkylated phenols, amines, amides, etc. In such instances invariably the approach was to introduce a counterbalancing effect by means of the addition of a hydrophile group, particularly ethylene oxide, or, in some instances, glycide, or perhaps a mixture of both hydrophile groups and hydrophobe groups, as, for example, in the introduction of propylene oxide along with ethylene oxide. In another type of material, a polymeric material such as a resin, has been subjected to reaction with an alkylene oxide including propylene oxide. In such instances certain derivatives obtained from polycarboxy acids have been employed.

Obviously, thousands and thousands of combinations, starting with hundreds of initial water-insoluble materials, are possible. Exploration of a large number of raw materials has yielded only a few which appear to be commercially practical and competitive with available demulsifying agents. 4,4′ Dihydroxy diphenyl sulfone happens to be one such compound. On the other hand, a somewhat closely comparable compound, p-p′-Bisphenol having the following structure:

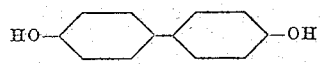

does not seem to yield analogous derivatives of nearly the effectiveness of 4,4′ dihydroxy diphenyl sulfone. The reason or reasons for this difference, is obviously obscure and merely a matter of speculation.

Of course, this much is obvious in regard to the sulfone as compared with p, p′-Bisphenol which contains another element in addition to carbon, hydrogen and oxygen, i .e., sulfur. Furthermore, the oxygen atoms attached to sulfur in the sulfone present an electronic structure not usually present in the absence of sulfur or a comparable element.

Exhaustive oxypropylation renders a water-soluble material water-insoluble. Similarly, it renders a kerosene-insoluble material kerosene-soluble; for instance, reference has been made to the fact that this is true, for example, using polypropylene glycol 2000. Actually, it is true with polypropylene glycol having lower molecular weights than 2000. These materials are obtained by the oxypropylation of a water-soluble kerosene-insoluble material, i. e., either water or propylene glycol.

Just why certain different materials which are water-insoluble to start with and which presumably are rendered more water-insoluble by exhaustive oxypropylation (if such expression "more water-insoluble" has significance), can be converted into a valuable surface-active agent and particularly a valuable demulsifying agent by reaction with a polycarboxy acid which does not particularly affect the solubility one way or the other—depending upon the selection of the acid—is unexplainable.

For convenience, what is said hereinafter will be divided into three parts:

Part 1 is concerned with the oxypropylation derivatives of 4,4′ dihydroxy diphenyl sulfone;

Part 2 is concerned with the preparation of esters from the aforementioned diols or dihydroxylated compounds;

Part 3 is concerned with the use of the products herein described as demulsifiers for breaking water-in-oil emulsions.

In actual manufacture it is simplest to make a sulfone which is a mixture of 2 isomers, to wit, 4,4′ sulfone and 2,4′ dihydroxydiphenyl sulfone. For sake of simplicity all references to the 4,4′ sulfone are intended to include the 2,4′ sulfone or mixtures. The preparation of the mixtures is described in Journal of the Chemical Society, 1949, pages 2854–56. The article is entitled "4:4′- and 2:4′-Dihydroxydiphenyl Sulphones." The authors are Hinkel and Summers. By way of illustration the following brief excerpt is included in substantially verbatim form:

"Sulphuric acid 98% (13 cc., 1 mol.) was added to phenol (53 g., 2–5 mols.) contained in a distilling flask fitted with a thermometer dipping into the reaction mixture and a receiver attached to the side-arm. The temperature of the mixture was quickly raised to 165° and maintained there for 6 hours during which some water was evolved. The temperature was then maintained at 195–200° for a further 6 hours during which more water and a little phenol distilled. Whilst still molten, the contents of the flask were poured into water and steam-distilled to remove the excess of phenol. Sufficient boiling water was added to effect complete dissolution. The solution was decolorized with charcoal, fitered, and left to cool, whereupon a mass of crystals separated (43 g.). Concentration of the aqueous nitrate to a very small bulk gave a further yield of crystals, M. P. ca. 170° (6 g.) (total yield, 49 g., 86%). The product consists of 4:4′-dihydroxydiphenyl sulphone containing approx. 16% of the 2:4′-isomeride. The two isomerides were separated as described later.

"If, in the above experiment, the initial mixture was kept at 25–30° for 3 days before being heated as described above, the yield of sulphones was 78% and they contained approx. 24% of the 2:4'-isomeride. The final aqueous filtrate from the sulphones was neutralised with aqueous ammonia and concentrated; a slight excess of a warm saturated aqueous solution of p-toluidine hydrochloride was added. On cooling, p-toluidine phenol-p-sulphonate separated; this crystallised from aqueous alcohol in prismatic crystals, M. P. 211°, unchanged by admixture with an authentic specimen (Found: N, 4.9; S, 11–1. $C_{13}H_{15}O_4NS$ requires N. 5.0; S, 11.3%).

"Separation of Isomers.—The well-dried crude product was dissolved in the minimum quantity of boiling acetone. Warm benzene (twice the volume of acetone used) was then added and the mixture set aside overnight in a cool place. A considerable quantity of solvate was deposited as prismatic crystals (A). These were removed and heated to 120° to remove the combined benzene (Found: loss on heating, 23.9. $C_{12}H_{10}O_4S$. $C_6H_6$ requires $C_6H_6$, 23.8%). The resulting 4:4'-dihydroxydiphenyl sulphone, which melted at 246–247° still contained traces of the 2:4'-isomeride and was again subjected to the acetone-benzene treatment. The crystals so obtained were added to boiling water, whereupon they dissolved with brisk evolution of benzene. The aqueous solution on cooling yielded 4:4'-dihydroxydiphenyl sulphone as very long needles, M. P. 249–5°. Further similar treatment with acetone-benzene did not raise the M. P. The dimethoxy-derivative, prepared in the usual manner and crystallised from alcohol, melted at 132° (Machek and Haas give M. P. 130–5°). The dibenzoate, prepared in the usual way, crystallised from alcohol in needles, M. P. 248–5° (Found: C, 68.3; H, 4.05; S, 7.0. $C_{24}H_{18}O_6S$ requires C, 68.1; H, 3.9; S, 7.0%)."

PART 1

For a number of well known reasons equipment, whether laboratory size, semi-pilot plant size, pilot plant size, or large scale size, is not, as a rule, designed for a particular alkylene oxide. Invariably and inevitably, however, or particularly in the case of laboratory equipment and pilot plant size, the design is such as to use any of the customarily available alkylene oxide, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions not only in regard to presence or absence of catalyst and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as, for example, 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature-low reaction rate oxypropylations have been described very completely in U. S. Patent No. 2,448,664, to H. R. Fife, et al., dated September 7, 1948. Low-temperature-low pressure oxypropylations are particularly desirable where the compound being subjected to oxypropylation contains one, two, or three points of reaction only, such as monohydric alcohols, glycols and triols.

Since low-pressure-low-temperature reaction speed oxypropylations require considerable time, for instance, 1 to 7 days of 24 hours each to complete the reaction, they are conducted as a rule whether on a laboratory scale, pilot plant scale, or large scale, so as to operate automatically. The prior figure of seven days applies especially to large-scale operations. I have used conventional equipment with two added automatic features:

(a) A solenoid-controlled valve which shuts off the propylene oxide in event that the temperature gets outside a predetermined and set range, for instance, 95° to 120° C.; and (b) Another solenoid valve which shuts off the propylene oxide (or for that matter ethylene oxide if it is being used) if the pressure gets beyond a predetermined range, such as 25 to 35 pounds.

Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation, whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out, the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line, charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water and further equipped with electrical heating devices. Such autoclaves are, of course, in essence, small-scale replicas of the usual conventional autoclave used in oxyalkylation procedures. In some instances in exploratory preparations an autoclave having a smaller capacity, for instance, approximately 5½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line which was used to pressure the bomb reservoir. To the extent that it was required any other usual conventional procedure or addition which provided greater safety was used, of course, such as safety glass, protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 93° C. Similarly, the pressure was held at approximately 30 pounds within a 5-pound variation one way or the other but might drop to practically zero, especially where no solvent such as xylene was employed. The speed of reaction was comparatively slow under such conditions as compared with oxyalkylations at 200° C. Numerous reactions were conducted in which the time varied from one day (24 hours), up to three days (72 hours), for completion of the final member of a series. In some instances, the reaction may take place in considerably less time, i. e., 24 hours or less, as far as a partial oxypropylation is concerned. The minimum time recorded was about a 4-hour period in a single step. Reactions indicated as being complete in 10 hours may have been complete in a lesser period of time in light of the automatic equipment employed. This applies also where the reactions were complete in a shorter period of time, for instance, 4 to 5 hours. In the addition of propylene oxide, in the autoclave equipment as far as possible the valves were set so all the propylene oxide, if fed continuously, would be added at a rate so that the predetermined amount would react within the first 15 hours of the 24-hour period or two-thirds of any shorter period. This meant that if the reaction was interrupted automatically for a period of time for pressure to drop or temperature to drop, the predetermined amount of oxide would still be added, in most instances, well within the predetermined time period. Sometimes where the addition was a comparatively small amount in a 10-hour period there would be an unquestionable speeding up of the reaction by simply repeating the examples and using 2, 3, or 4 hours instead of 5 hours.

When operating at a comparatively high temperature, for instance, between 150° to 200° C., an unreacted alkylene oxide, such as propylene oxide, makes its presence felt in the increase in pressure or the consistency of a higher pressure. However, at a low enough temperature it may happen that the propylene oxide goes in as a liquid. If so, and if it remains unreacted, there is, of course, an inherent danger and appropriate steps must be taken to safeguard against this possibility; if need be, a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule being larger the opportunity for random reaction is decreased. Inversely, the lower the molecular weight the faster the reaction takes place. For this reason, sometimes at least, increasing the concentration of the catalyst does not appreciably speed up the reaction particularly when the product subjected to oxyalkylation has a comparatively high molecular weight. However, as has been pointed out previously, operating at a low pressure and a low temperature even in large scale operations as much as a week or ten days' time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one or two hours so that reaction continued for 1 to 3 hours after the final addition of the last propylene oxide, and thereafter the operation was shut down. This particular device is particularly suitable for use on larger equipment than laboratory size autoclaves, to wit, on semi-pilot plant or pilot plant size as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gases, check valves and entire equipment. As far as I am aware at least two firms, and possibly three, specialize in autoclave equipment such as I have employed in the laboratory, and are prepared to furnish equipment of this same kind. Similarly, pilot plant equipment is available. This point is simply made as a precaution in the direction of safety. Oxyalkylations, particularly involving ethylene oxide, glycide, propylene oxide, etc., should not be conducted except in equipment specifically designed for the purpose.

Example 1a

The starting material was commercial 4,4' dihydroxydiphenyl sulfone. The particular autoclave employed was one having a capacity of a little over a gallon. The speed of the stirrer could be varied from 150 to 350 R. P. M. The autoclave was charged with 500 grams of sulfone, 50 grams caustic soda, and 500 grams xylene. The caustic soda was finely powdered and so was the sulfone. The xylene added was just sufficient to produce a slurry. The reaction pot was flushed out with nitrogen. The autoclave was sealed and the automatic devices adjusted for injecting 1850 grams of propylene oxide in a 6-hour period. The rate was set for about 400 to 450 grams per hour. The pressure was set for a maximum of 35 pounds per square inch. This meant that the bulk of the reaction could take place, and probably did take place, at a lower pressure. The comparatively low pressure was the result of the fact that considerable catalyst was present and also the reaction time was fairly long, i. e., 6 hours. As indicated, the addition of propylene oxide was comparatively slow and, more important, the selected temperature was 110° C., or slightly above the boiling point of water. The initial introduction of propylene oxide was not started until the heating devices had raised the temperature to above 108° C. At the completion of the reaction a sample was taken and oxypropylation proceeded as in Example 2a, following. This same example was duplicated and portions used for subsequent Examples 3a, 4a, and 5a, as noted below.

Example 2a 535 grams of the reaction mass identified as Example 1a, preceding, equivalent to initially 96 grams of the sulfone, 333 grams of the oxide, 10 grams of the caustic soda, and 96 grams of solvent were reacted with 1331 grams of propylene oxide. The reaction temperature was slightly higher than in Example 1a, to wit, 115° C. The maximum pressure as in Example 1a was 35 pounds per square inch. The time required to introduce the oxide was 10 hours. It was introduced at about the rate of 175 grams per hour.

Example 3a 584 grams of the reaction mass identified as Example 1a, preceding, equivalent to initially 104 grams of sulfone, 366 grams of propylene oxide, 10 grams of caustic soda, and 104 grams of solvent, were reacted with 110 grams of propylene oxide. The conditions of reaction as far as temperature and pressure were concerned were the same as in Example 2a, preceding. The oxide was added in 4 hours. The rate was approximately 400 grams per hour.

Example 4a 1116 grams of the reaction mass identified as Example 1a, preceding, equivalent to initially 193 grams of sulfone, 711 grams of the oxide, 19 grams of caustic soda, and 193 grams of solvent, were reacted with 348 grams of propylene oxide. The conditions of temperature and pressure were the same as in Example 2a, preceding. The time required to add the oxide was 4 hours. The oxide was added at the rate of about 125 grams per hour.

Example 5a 476 grams of the reaction mass identified as Example 1a, preceding, equivalent initially to 46.1 grams of sulfone, 379 grams of oxide, 4.6 grams of caustic soda, and 46.1 grams of solvent, were reacted with 669 grams of propylene oxide. The conditions of reaction, as far as temperature and pressure were concerned, were the same as in Example 2a, preceding. The time required to add the oxide was 8 hours. The rate was at about 150 grams per hour.

In this particular series of examples the oxypropylations covered the range indicated. I have conducted the same experiments using the 2,4' isomer or mixtures prepared in the manner described previously. Similarly, in other series I have continued oxypropylations so the theoretical molecular weights were approximately 9,000 to 10,000 with the hydroxyl molecular weights between 3,500 and 4,500.

What has been said herein is presented in tabular form in Table 1, immediately following, with some added information as to molecular weight and as to solubility of the reaction product in water, xylene and kerosene.

TABLE 1

| Ex. No. | Composition before | | | Composition at end | | | | Mol. Wt. by Hyd. Determin. | Max. Temp., °C. | Max. Pres., lbs. sq. in. | Time, Hrs. |
|---|---|---|---|---|---|---|---|---|---|---|---|
| | Sulfone Amt., grs. | Oxide Amt., grs. | Catalyst, grs. | Theo. Mol. Wt. | Sulfone Amt., grs. | Oxide Amt., grs. | Catalyst, grs. | | | | |
| 1a | 500 | | 50 | 1,025 | 500 | 1,850 | 50 | 940 | 110 | 35 | 6 |
| 2a | 96 | 333 | 10 | 3,995 | 96 | 1,664 | 10 | 2,440 | 115 | 35 | 10 |
| 3a | 104 | 366 | 10 | 3,095 | 104 | 1,376 | 10 | 1,750 | 115 | 35 | 4 |
| 4a | 193 | 711 | 19 | 1,415 | 193 | 1,059 | 19 | 1,420 | 115 | 35 | 4 |
| 5a | 46.1 | 379 | 4.6 | 5,178 | 46.1 | 1,048 | 4.6 | 2,370 | 115 | 35 | 8 |

Examples 1a through 5a were insoluble in water, but soluble in xylene; Example 1a was insoluble in kerosene, and Examples 2a through 5a were soluble in kerosene.

In each instance there was present at the start of the oxypropylation an amount of solvent (xylene) equal in weight to the amount of sulfone.

Ordinarily in the initial oxypropylation of a simple compound such as ethylene glycol or propylene glycol, the hydroxyl molecular weight is apt to approximate the theoretical molecular weight based on completeness of reaction if oxypropylation is conducted slowly and at a comparatively low temperature, as described. In this instance, however, this does not seem to follow as it is noted in the preceding table that the point where the theoretical molecular weight is approximately 3,000 the hydroxyl molecular weight is only about one-half this amount. This generalization does not necessarily apply where there are more hydroxyls present, and in the present instance the results are somewhat peculiar when compared with simple dihydroxylated materials as described or with phenols.

The fact that such pronounced variation takes place between hydroxyl molecular weight and theoretical molecular weight based on completeness of reaction has been subjected to examination and speculation but no satisfactory rationale has been suggested. When a nitrogen-containing compound is present, such as in the oxypropylation of acetamide or polyamine, the situation becomes even more confused.

One suggestion has been that one hydroxyl is lost by dehydration and that this ultimately causes a break in the molecular in such a way that two new hydroxyls are formed. This is shown after a fashion in a highly idealized manner in the following way:

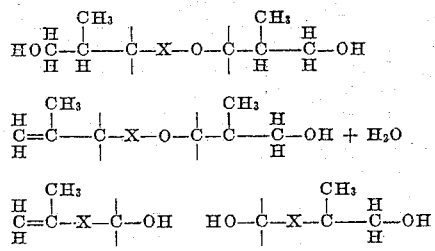

In the above formulas the large X is obviously not intended to signify anything except the central part of a large molecule, whereas, as far as a speculative explanation is concerned, one need only consider the terminal radicals as shown. Such suggestion is of interest only because it may be a possible explanation of how an increase in hydroxyl value does take place which could be interpreted as a decrease in molecular weight. This matter is considered subsequently in the final paragraphs of the next part, i. e., Part 2.

The final products at the end of the oxypropylation step were somewhat viscous liquids at the most slightly more viscous than ordinary polypropylene glycols, with a slight amber tint. This color, of course, could be removed, if desired, by means of bleaching clays, filtering chars, or the like. The products were slightly alkaline due to the residual caustic soda. The residual basicity due to the catalyst would be the same if sodium methylate had been employed.

Needless to say, there is no complete conversion of propylene oxide into the desired hydroxylated compounds. This is indicated by the fact that the theoretical molecular weight, based on a statistical average, is greater than the molecular weight calculated by usual methods on basis of acetyl or hydroxyl value. This is true even in the case of a normal run of the kind noted previously. It is true also in regard to the oxypropylation of simple compounds, for instance, pentaerythritol, sorbitol, or the like, which do not show the abnormal characteristics sometimes noted in the oxypropylation of TMC (tetramethylolcyclohexanol).

Actually, there is no completely satisfactory method for determining molecular weights of these types of compounds with a high degree of accuracy when the molecular weights exceed 2,000. In some instances, the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2, the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out, the present invention is concerned with acidic esters obtained from the oxypropylated derivatives described in Part 1, immediately preceding, and polycarboxy acids, particularly dicarboxy acids such as adipic acid, phthalic acid, or anhydride, succinic acid, diglycollic acid, sebacic acid, azeleic acid, aconitic acid, maleic acid or anhydride, citraconic acid or anhydride, maleic acid or anhydride adducts, as obtained by the Diels-Alder reaction from products such as maleic anhydride, and cyclopentadiene. Such acids should be heat-stable so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote & Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as para-toluene sulfonic acid as a catalyst. There is some objection to this because in some instances there is some evidence that this acid catalyst tends to decompose or rearrange heat-oxypropylated compounds, and particularly likely to do so if the esterification temperature is too high. In the case of polycarboxy acids such as diglycollic acid, which is strongly acidic, there is no need to add any catalyst. The use of hydrochloric gas has one advantage over para-toluene sulfonic acid and that is that at the end of the reaction it can be removed by flushing out with nitrogen, whereas there is no reasonably convenient means available of removing the para-toluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol as described in the final procedure just preceding Table 2.

The products obtained in Part 1, preceding, may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives described in Part 1 is then diluted further with sufficient xylene decalin, petroleum solvent, or the like, so that one has obtained approximately a 65% solution. To this solution there is added a polycarboxylated reactant, as previously described, such as phthalic anhydride, succinic acid, or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the dehydrated sodium sulfate and probably the sodium chloride formed. The clear, somewhat viscous, straw-colored amber liquid so obtained may contain a small amount of sodium sulfate or sodium chloride, but in any event, is perfectly acceptable for esterification in the manner described.

It is to be pointed out that the products here described are not polyesters in the sense that there is a plurality of both diol radicals and acid radicals; the product is characterized by having only one diol radical.

In some instances, and in fact, in many instances, I have found that in spite of the dehydration methods employed above a mere trace of water still comes through, and that this mere trace of water certainly interferes with the acetyl or hydroxyl value determination, at least when a number of conventional procedures are used and may retard esterification particularly where there is no sulfonic acid or hydrochloric acid present as a catalyst. Therefore, I have preferred to use the following procedure: I have employed about 200 grams of the diol compound, as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of a carboxy reactant and also about 150 grams of a high boiling aromatic petroleum solvent. These solvents are sold by various oil refineries, and, as far as solvent effect, act as if they were almost completely aromatic in character. Typical distillation data in the particular type I have employed and found very satisfactory is the following:

I. B. P., 142°
5 ml., 200° C.
10 ml., 209° C.
15 ml., 215° C.
20 ml., 216° C.
25 ml., 220° C.
30 ml., 225° C.
35 ml., 230° C.
40 ml., 234° C.
45 ml., 237° C.
50 ml., 242° C.
55 ml., 244° C.
60 ml., 248° C.
65 ml., 252° C.
70 ml., 252° C.
75 ml., 260° C.
80 ml., 264° C.
85 ml., 270° C.
90 ml., 280° C.
95 ml., 307° C.

After this material is added, refluxing is continued and, of course, is at a high temperature, to wit, about 160° to 170° C. If the carboxy reactant is an anhydride, needless to say, no water of reaction appears; if the carboxy reactant is an acid water of reaction should appear and should be eliminated at the above reaction temperature. If it is not eliminated, I simply separate out another 10 to 20 cc. of benzene by means of the phase-separating trap and thus raise the temperature to 180° or 190° C., or even to 200° C., if need be. My preference is not to go above 200 C.

The use of such solvent is extremely satisfactory, provided one does not attempt to remove the solvent subsequently except by vacuum distillation, and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent such as decalin or an alkylated decalin which has a rather definite or close range boiling point. The removal of the solvent, of course, is purely a conventional procedure and requires no elaboration.

In the appended table Solvent #7-3, which appears in all instances, is a mixture of 7 volumes of the aromatic petroleum solvent previously described and 3 volumes of benzene. This was used, or a similar mixture, in the manner previously described. In a large number of similar examples decalin has been used but it is my preference to use the above mentioned mixture, and particularly with the preliminary step of removing all the water. If one does not intend to remove the solvent my preference is to use the petroleum solvent-benzene mixture although obviously any of the other mixtures, such as decalin and xylene, can be employed.

The data included in the subsequent tables, i. e., Tables 2 and 3, are self-explanatory and very complete and it is believed no further elaboration is necessary.

TABLE 2

| Ex. No. of Acid Ester | Ex. No of Hyd. Cmpd. | Theo. M.W. of H.C. | Theo. Hydroxyl V. of H.C. | Actual Hydroxyl Value | Mol. Wt. Based on Actual H.V. | Amt. of Hyd. Cmpd. (grs.) | Polycarboxy Reactant | Amt. of Polycarboxy Reactant, grs. |
|---|---|---|---|---|---|---|---|---|
| 1b | 1a | 1,025 | 109.5 | 119.5 | 940 | 213 | Diglycolic Acid | 60.5 |
| 2b | 1a | 1,025 | 109.5 | 119.5 | 940 | 207 | Oxalic Acid | 56.0 |
| 3b | 1a | 1,025 | 109.5 | 119.5 | 940 | 200 | Maleic Anhyd | 41.6 |
| 4b | 1a | 1,025 | 109.5 | 119.5 | 940 | 200 | Phthalic Anhyd | 63.0 |
| 5b | 2a | 3,995 | 28.0 | 46.0 | 2,440 | 200 | Diglycolic Acid | 22.1 |
| 6b | 2a | 3,995 | 28.0 | 46.0 | 2,440 | 206 | Oxalic Acid | 21.2 |
| 7b | 2a | 3,995 | 28.0 | 46.0 | 2,440 | 209 | Aconitic Acid | 29.8 |
| 8b | 2a | 3,995 | 28.0 | 46.0 | 2,440 | 200 | Pithalic Anhyd | 24.2 |
| 9b | 2a | 3,995 | 28.0 | 46.0 | 2,440 | 209 | Maleic Anhyd | 16.8 |
| 10b | 2a | 3,995 | 28.0 | 46.0 | 2,440 | 206 | Citraconic Anhyd | 18.9 |
| 11b | 3a | 3,095 | 36.3 | 64.2 | 1,750 | 208 | Diglycolic Acid | 31.6 |
| 12b | 3a | 3,095 | 36.3 | 64.2 | 1,750 | 203 | Oxalic Acid | 29.2 |
| 13b | 3a | 3,095 | 36.3 | 64.2 | 1,750 | 208 | Citraconic Anhyd | 26.4 |
| 14b | 3a | 3,095 | 36.3 | 64.2 | 1,750 | 202 | Aconitic Acid | 40.5 |
| 15b | 4a | 1,415 | 79.4 | 79.0 | 1,420 | 206 | Diglycolic Acid | 38.8 |
| 16b | 4a | 1,415 | 79.4 | 79.0 | 1,420 | 206 | Oxalic Acid | 36.5 |
| 17b | 4a | 1,415 | 79.4 | 79.0 | 1,420 | 203 | Maleic Anhyd | 28.0 |
| 18b | 4a | 1,415 | 79.4 | 79.0 | 1,420 | 206 | Phthalic Anhyd | 43.0 |
| 19b | 5b | 5,178 | 21.77 | 47.4 | 2,370 | 201 | Diglycolic Acid | 22.8 |
| 20b | 5b | 5,178 | 21.7 | 47.4 | 2,370 | 203 | Oxalic Acid | 21.6 |
| 21b | 5b | 5,178 | 21.7 | 47.4 | 2,370 | 200 | Phthalic Anhyd | 25.0 |
| 22b | 5b | 5,178 | 21.7 | 47.4 | 2,370 | 201 | Maleic Anhyd | 16.7 |

TABLE 3

| Ex. No. of Acid Ester | Solvent | Amt. Solvent (grs.) | Maximum Esterification Temp., °C. | Time of Esterification (hrs.) | Water Out (cc.) |
|---|---|---|---|---|---|
| 1b | #7-3 | 266 | 140 | 6 | 8.1 |
| 2b | #7-3 | 239 | 130 | 2⅔ | 24.5 |
| 3b | #7-3 | 242 | 145 | 2½ | |
| 4b | #7-3 | 263 | 148 | 5 | |
| 5b | #7-3 | 218 | 158 | 5 | 3.0 |
| 6b | #7-3 | 218 | 142 | 1½ | 10.4 |
| 7b | #7-3 | 236 | 155 | 2½ | 3.1 |
| 8b | #7-3 | 224 | 160 | 5⅔ | 0.2 |
| 9b | #7-3 | 226 | 152 | ¾ | |
| 10b | #7-3 | 225 | 156 | 2 | 0.4 |
| 11b | #7-3 | 236 | 168 | 4¼ | 4.2 |
| 12b | #7-3 | 217 | 132 | 1 | 12.6 |
| 13b | #7-3 | 234 | 153 | 2⅔ | |
| 14b | #7-3 | 240 | 162 | 4¾ | 4.1 |
| 15b | #7-3 | 240 | 146 | 4½ | 5.0 |
| 16b | #7-3 | 227 | 138 | 1 | 15.6 |
| 17b | #7-3 | 231 | 155 | 2⅔ | |
| 18b | #7-3 | 249 | 153 | 3⅔ | |
| 19b | #7-3 | 220 | 153 | 4⅔ | 3.1 |
| 20b | #7-3 | 216 | 140 | 1½ | 9.6 |
| 21b | #7-3 | 225 | 155 | 4½ | |
| 22b | #7-3 | 218 | 153 | 2⅔ | |

The procedure for manufacturing the esters has been illustrated by preceding examples. If, for any reason, reaction does not take place in a manner that is acceptable, attention should be directed to the following details:

(a) Recheck the hydroxyl or acetyl value of the oxypropylated products of the kind specified, and use a stoichiometrically equivalent amount of acid;

(b) If the reaction does not proceed with reasonable speed, either raise the temperature indicated or else extend the period of time up to 12 or 16 hours, if need be;

(c) If necessary, use ½% of paratoluene sulfonic acid, or some other acid as a catalyst; and (d) If the esterification does not produce a clear product, a check should be made to see if an inorganic salt such as sodium chloride or sodium sulfate is not precipitating out. Such salt should be eliminated, at least for exploration experimentation, and can be removed by filtering.

Everything else being equal, as the size of the molecule increase and the reactive hydroxyl radical represents a smaller fraction of the entire molecule, thus more difficulty is involved in obtaining complete esterification.

Even under the most carefully controlled conditions of oxypropylation involving comparatively low temperatures and long time of reaction, there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances, an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration, or, if desired, the esterification procedure can be repeated using an appropriately reduced ratio of carboxylic reactant.

Even the determination of the hydroxyl value and conventional procedure leaves much to be desired due either to the cogeneric materials previously referred to, or, for that matter, the presence of any inorganic salts or propylene oxide. Obviously, this oxide should be eliminated.

The solvent employed, if any, can be removed from the finished ester by distillation, and particularly vacuum distillation. The final products or liquids are generally from almost water white or pale straw to a light amber in color, and show moderate viscosity. They can be bleached with bleaching clays, filtering chars, and the like. However, for the purpose of demulsification or the like, color is not a factor and decolorization is not justified.

In the above instances I have permitted the solvents to remain present in the final reaction mass. In other instances I have followed the same procedure, using decalin or a mixture of decalin or benzene in the same manner and ultimately removed all the solvents by vacuum distillation.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000, or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases, mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily, the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind (diluted or undiluted) is placed at the well-head where the effluent liquids leave the well. This reservoir or container, which may vary from 5 gallons to 50 gallons for convenience, is connected to a proportioning pump which injects the demulsifier dropwise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2,000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances, the oxyalkylated products herein specified as demulsifiers can be conveniently used without dilution. However, as previously noted, they may be diluted as desired with any suitable solvent. For instance, by mixing 75 parts, by weight, of an oxyalkylated derivative, for example, the product of Example 19b with 15 parts, by weight, of xylene and 10 parts, by weight, of isopropyl alcohol, an excellent demulsifier is obtained. Selection of the solvent will vary, depending upon the solubility characteristics of the oxyalkylated product, and, of course, will be dictated, in part, by economic considerations, i. e., cost.

As noted above, the products herein described may be used not only in diluted form, but also may be used admixed with some other chemical demulsifier.

Having thus described my invention what I claim as new and desire to secure by Letters Patent, is:

1. A process for breaking petroleum emulsions of the water-in-oil type, characterized by subjecting the emulsion to the action of a demulsifier including hydrophile synthetic products; said hydrophile synthetic products being characterized by the following formula:

in which R' is the radical of a member of the class selected from 4,4' dihydroxydiphenyl sulfone, 2,4' dihydroxydiphenyl sulfone and a mixture of the two isomers; $n$ and $n'$ are numerals with the proviso that $n$ and $n'$ equal a sum varying from 15 to 80, and $n''$ is a whole number not over 2, and R is the radical of the polybasic acid.

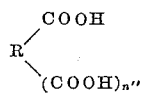

in which $n''$ has its previous significance, and with the further proviso that the parent dihydroxylated compound prior to esterification be water-insoluble.

2. A process for breaking petroleum emulsions of the water-in-oil type, characterized by subjecting the emulsion to the action of a demulsifier including hydrophile synthetic products; said hydrophile synthetic products being characterized by the following formula:

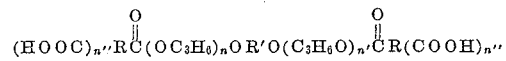

in which R' is the radical of a member of the class selected from 4,4' dihydroxydiphenyl sulfone, 2,4' dihydroxydiphenyl sulfone and a mixture of the two isomers, $n$ and $n'$ are numerals with the proviso that $n$ and $n'$ equal a sum varying from 15 to 80, and $n''$ is a whole number not over 2, and R is the radical of the polybasic acid

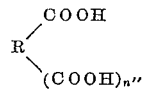

in which $n''$ has its previous significance, and with the further proviso that the parent dihydroxylated compound prior to esterification be water-insoluble, and kerosene-soluble.

3. A process for breaking petroleum emulsions of the water-in-oil type, characterized by subjecting the emulsion to the action of a demulsifier including hydrophile synthetic products; said hydrophile synthetic products being characterized by the following formula

in which R' is the radical of a member of the class selected from 4,4' dihydroxydiphenyl sulfone, 2,4' dihydroxydiphenyl sulfone and a mixture of the two isomers; $n$ and $n'$ are numerals with the proviso that $n$ and $n'$ equal a sum varying from 15 to 80, and $n''$ is a whole number not over 2, and R is the radical of the polybasic acid

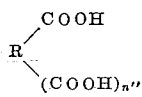

in which $n''$ has its previous significance; said polycarboxy acid having not over 8 carbon atoms; and with the further proviso that the parent dihydroxylated compound prior to esterification be water-insoluble, and kerosene-soluble.

4. A process for breaking petroleum emulsions of the water-in-oil type, characterized by subjecting the emulsion to the action of a demulsifier including hydrophile synthetic products; said hydrophile synthetic products being characterized by the following formula:

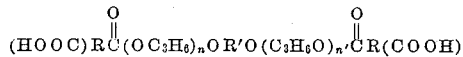

in which R is the radical of a member of the class selected from 4,4' dihydroxydiphenyl sulfone, 2,4' dihydroxydiphenyl sulfone and a mixture of the two isomers; $n$ and $n'$ are numerals with the proviso that $n$ and $n'$ equal a sum varying from 15 to 80, and R is the radical of the polybasic acid

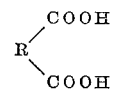

said dicarboxy acid having not over 8 carbon atoms; and with the further proviso that the parent dihydroxylated compound prior to esterification be water-insoluble and kerosene-soluble.

5. The process of claim 4 wherein the dicarboxy acid is phthalic acid.

6. The process of claim 4 wherein the dicarboxy acid is maleic acid.

7. The process of claim 4 wherein the dicarboxy acid is succinic acid.

8. The process of claim 4 wherein the dicarboxy acid is citraconic acid.

9. The process of claim 4 wherein the dicarboxy acid is diglycollic acid.

MELVIN DE GROOTE.

REFERENCES CITED

The following references are of record in the file of this patent:

UNITED STATES PATENTS

| Number | Name | Date |
|---|---|---|
| 2,562,878 | Blair | Aug. 7, 1951 |